United States Patent [19]

Senoo

[11] 3,961,029
[45] June 1, 1976

[54] PROCESS FOR RECOVERING CHROMIC ACID SOLUTION FROM A WASTE LIQUOR CONTAINING CHROMIC IONS

[75] Inventor: Yoshio Senoo, Tokyo, Japan

[73] Assignee: Tokico Ltd., Tokyo, Japan

[22] Filed: May 6, 1974

[21] Appl. No.: 467,612

[30] Foreign Application Priority Data

May 21, 1973 Japan................. 48-56549
Dec. 20, 1973 Japan................. 48-143322

[52] U.S. Cl.................. 423/54; 210/37 R; 210/38 B; 210/42 R; 423/55
[51] Int. Cl.$^2$.......................... C01G 37/12
[58] Field of Search............. 423/54, 55; 210/37, 210/38, 42, ; 75/101 BE

[56] References Cited
UNITED STATES PATENTS

| 2,733,204 | 1/1956 | Costa | 423/54 |
| 3,658,470 | 4/1972 | Zieuers et al. | 423/54 |
| 3,681,210 | 8/1972 | Zieuers et al. | 210/38 |
| 3,787,555 | 1/1974 | Bruen et al. | 423/54 |
| 3,847,757 | 11/1974 | Smith | 423/54 |
| 3,856,916 | 12/1974 | Le Francois et al. | 210/37 |
| 3,896,209 | 7/1975 | Fournier et al. | 423/55 |

FOREIGN PATENTS OR APPLICATIONS

| 546,394 | 9/1957 | Canada | 423/54 |

*Primary Examiner*—Herbert T. Carter

[57] ABSTRACT

From a chromate ion-containing aqueous waste liquor the chromate ion can be advantageously recovered in the form of chromic acid by the process comprising the steps of adding a reducing agent to the chromate ion-containing aqueous waste liquor to precipitate the chromate ion in the form of chromium (III) hydroxide; adding an alkali and aqueous hydrogen peroxide to the precipitated chromium (III) hydroxide to produce a chromate ion-containing aqueous solution; and passing the resultant chromate ion-containing aqueous solution through an H form acidic cation-exchange resin.

7 Claims, No Drawings

PROCESS FOR RECOVERING CHROMIC ACID SOLUTION FROM A WASTE LIQUOR CONTAINING CHROMIC IONS

FIELD OF THE INVENTION

This invention relates to a process for recovering from a chromate ion ($CrO_4^{-2}$)-containing aqueous waste liquor the chromate ion in the form of chromic acid ($H_2CrO_4$).

BACKGROUND OF THE INVENTION

As the chromate ion-containing aqueous waste liquors there may be mentioned in general those effluents, for example, from a chromium plating process, chromic acid production process or the like. The chromate ion contained in these aqueous liquors are detrimental to health and therefore disposing the liquors without further treatment would cause environmental pollution now being raised as a serious social problem. As a consequence, it has been necessary to render the liquors free of the chromate ion.

Conventional processes for disposing such chromate ion-containing aqueous liquor involve the steps of previously adding a reducing agent to the liquor to reduce the chromate ion in the liquor to trivalent chromium ion ($Cr^{+3}$), adding to the resultant liquor an alkali, such as caustic soda, to precipitate the chromate ion in the form of chromium (III) hydroxide, removing the precipitate and then disposing the residual liquor. Another conventional process involves passing the chromate ion-containing aqueous liquor through a strongly basic anion-exchange resin to adsorb and remove the chromate ion, thus rendering the liquor innocuous, and then disposing the effluent. In the case of using the strongly basic anion-exchange resin, the chromate ion adsorbed on the resin is desorbed, for example, with an aqueous alkali solution, and the chromate ion taken up into the desorbing solution is, analogously to the manner as described above, reduced with a reducing agent to trivalent chromium ion, to which an alkali is added to precipitate the ion in the form of chromium (III) hydroxide. In the conventional processes of disposal as described above, the chromium (III) hydroxide formed is filtered off and drained to provide a cake and the cake, optionally after drying the same, then discarded in suitable places, so that the chromate ion in the aqueous liquor can not be reused efficiently. In addition, a process has been recently proposed which involves passing an aqueous liquor containing chromate ion through a cation-exchange resin and an anion-exchange resin to clean up the liquor, simultaneously recovering the chromate ion contained in the liquor in the form of an aqueous chromic acid solution. In this process, besides the chromate ion different anions also contained in the above described aqueous liquor will necessarily be contaminated as impurities into the resultant aqueous chromic acid solution, which makes it difficult to recover from the aqueous liquor containing chromate ion the chromate ion in the form of chromic acid of use.

It is apparent from the foregoing that if it becomes possible to recover efficiently the chromate ion from an aqueous waste liquor containing chromate ion, the liquor would be rendered innocuous and at the same time such recovery is desirable from the standpoint of efficient utilization of resources. Thus, a proposal of an advantageous process for the recovery of the chromate ion has been greatly demanded for.

SUMMARY OF THE INVENTION

An object of the present invention is therefore to provide a process wherein from an aqueous waste liquor containing chromate ion, the chromate ion is recovered in the useful form of chromic acid ($H_2CrO_4$), and at the same time the liquor itself is rendered innocuous.

This and other objects of the present invention will become apparent from the description given hereinafter.

In view of the above enumerated circumstances, the inventor has made extensive studies on a process whereby from an aqueous waste liquor containing chromate ion the chromate ion can be recovered in the useful form while rendering the liquor innocuous, and has found that the chromate ion-containing aqueous liquor can be rendered innocuous by adding a reducing agent to the aqueous liquor to reduce the chromate ion contained in the liquor to trivalent chromium ion ($Cr^{+3}$), which precipitates in the form of chromium (III) hydroxide [$Cr(OH)_3$], and thereafter removing the precipitate; and also that from the precipitate, that is chromium (III) hydroxide, there is obtainable a useful aqueous chromic acid ($H_2CrO_4$) solution by adding aqueous hydrogen peroxide, in the presence of an alkali, to the precipitate to oxidize the chromium in the chromium (III) hydroxide to hexavalent chromium present in the form of chromate ion ($CrO_4^{-2}$), thereby forming a chromate ion-containing aqueous solution, and then by passing the resultant chromate ion-containing aqueous solution through an acidic cation-exchange resin, such as a strong acid (sulfonic) cation-exchange resin in the hydrogen ion form.

The present invention has been made on the basis of the above described findings and is characterized in that steps of adding a reducing agent to a chromate ion-containing aqueous waste liquor to precipitate the chromate ion in the form of chromium (III) hydroxide; adding both an alkali and aqueous hydrogen peroxide to the resultant chromium (III) hydroxide precipitate to produce a chromate ion-containing aqueous solution; and passing the resultant chromate ion-containing aqueous solution through an H form acidic cation-exchange resin.

DETAILED DESCRIPTION OF THE INVENTION

In practicing the present invention, to an aqueous liquor containing chromate ion, such as waste liquor, from chromium plating processes is first added a reducing agent known in general as a chemical substance having reducing action, for example, ethanol, sodium nitrite, metallic iron, ferrous sulfate, sulfurous acid gas, sodium sulfite, ammonium hydrogen sulfite ($NH_4HSO_3$), potassium hydrogen sulfite ($KHSO_3$), calcium hydrogen sulfite [$Ca(HSO_3)_2$] or sodium hydrogen sulfite ($NaHSO_3$), to reduce the chromate ion contained in the aqueous liquor to trivalent chromium ion, thereby precipitating chromium (III) hydroxide. This first step may advantageously be carried out in such a manner that after adding sulfuric acid ($H_2SO_4$) to the aqueous liquor to adjust the pH of the liquor to around 3, (e.g. 2.5–3.5), the reducing agent is added to the liquor with stirring at room temperature, and that after the reaction the precipitation of $Cr(OH)_3$ is accelerated by adding, if necessary, an alkali such as caustic soda to render the pH alkaline. In addition, for substantially completely converting the chromate ion in the chromate ion-containing aqueous liquor, it is desirable to add the reducing agent in a slight excess amount with respect to the chromate ion. Since the residual liquor from which the so precipitated chromium (III) hydroxide has been separated contains no chromate ion any more, it may be discarded as such. To the separated chromium (III) hydroxide precipitate is added, in the presence of an alkali such as sodium hydroxide, aqueous hydrogen peroxide to oxidize the chromium in the chromium (III) hydroxide to hexavalent chromium, thus forming an aqueous solution containing the chromate ion. As regards the ratio in the amounts of the alkali and aqueous hydrogen peroxide used in this step, for example, for 50 to 80 g of chromium (III) hydroxide with 80 to 90% water content, addition of 10 to 30 ml of 35% aqueous hydrogen peroxide to which 5 g to 15 g of sodium hydroxide is added suffices. In this case the pH will become a value of 9 or above. It should be noted that the above described oxidation reaction in accordance with the present invention is advantageously effected at an alkaline pH range of 7.5 or higher. When the trivalent chromium in the chromium (III) hydroxide is converted in this manner an aqueous solution containing the chromate ion forms. Subsequently thereto, the thus obtained chromate ion-containing aqueous solution is passed through an H form cation-exchange resin (e.g. sulfonic or carboxylic type), such as DOWEX 50 W × 8 (manufactured by Dow Chemical Co.), LEWATIT SP120 (manufactured by Farbenfabriken Bayer AG.), AMBERLITE 200 C (manufactured by Organon N.V.) or DIAION SK1B (manufactured by Mitsubishi Chemical Industries, Ltd.) or through an H form weakly acidic cation-exchange resin such as DOWEX CCR-2 (manufactured by Dow Chemical Co.), LEWATIT CNP (manufactured by Farbenfabriken Bayer AG.), AMBERLITE IRC-50 (manufactured by Organon N.V.) or DIAION WK10 (manufactured by Mitsubishi Chemical Industries, Ltd.). Strong-acid resins (sulfonic types) are preferred, whereupon the cation like $Na^+$ in the aqueous solution is exchanged with $H^+$ in the strongly acidic cation-exchange resin (or weakly acidic cation-exchange resin), thus giving an aqueous chromic acid ($H_2CrO_4$) solution. The above described strongly acidic cation-exchange resin or weakly acidic cation-exchange resin can be easily regenerated by passing a regenerating aqueous solution therethrough, such as 10% HCl or 10% $H_2SO_4$. The thus obtained aqueous chromic acid solution may be used as such for use in chromium plating or a variety of chromic acid salts may be produced from the aqueous chromic acid solution, which salts find different uses.

In addition, in accordance with the present invention, efficient utilization of the chromate ion-containing aqueous solution itself becomes possible. Thus, it becomes possible to clean up the chromate ion-containing aqueous liquor to give cleaned-up water while recovering the chromate ion in the form of chromic acid. The cleaned-up water can be reused, for example, in chromium plating processes.

Thus, for example, a waste water discharged from a chromium plating process is deionized by passing the same through an H form acidic cation-exchange resin and then through a an OH form basic anion-exchange resin to give cleaned up water, while the basic anion-exchange resin is regenerated with an alkaline aqueous solution to desorb the chromate ion adsorbed on the anion-exchange resin. To the thus obtained effluent containing the chromate ion is added a chemical substance having reducing power, that is reducing agent of the type as described above, to precipitate the chromate ion in the effluent as chromium (III) hydroxide. The thus obtained chromium (III) hydroxide is then separated from the effluent, followed by addition of an alkali and aqueous hydrogen peroxide, to form a chromate ion-containing aqueous solution. The thus obtained chromate ion-containing aqueous solution is then passed through an H form acidic cation-exchange resin to obtain an aqueous chromic acid solution. By recycling the above described cleaned-up water and aqueous chromic acid solution obtained in this manner to the chromium plating process step, it becomes possible to efficiently dispose the waste water from chromium plating processes in a so-called closed system. The H form acidic cation-exchange resin used in this case includes those type as described above, while the OH form basic anion-exchange resin includes, for example, OH form medium basic anion-exchange resins such as LEWATIT MP64 (manufactured by Farbenfabriken Bayer AG.), and OH form weakly basic anion-exchange resins such as AMBERLITE IRA-93 (manufactured by Organon N.V.), AMBERLITE IRA-45 (manufactured by Organon N.V.) and Diaion WA-10 (manufactured by Mitsubishi Chemical Industries, LTD.). In addition, in cleaning up the waste water from chromium plating processes, an in-series combination of a cation-exchange resin column and an anion-exchange resin column may be used, although for enhancing the cleanup efficiency it is preferable to employ, if necessary, multi-staged in-series combination of two or more cation-exchange resin columns and two or more anion-exchange resin columns.

As is apparent from the foregoing, in accordance with the present invention, aqueous liquors containing chromate ion can be rendered innocuous and at the same time the chromate ion can be recovered in the useful form of chromic acid. Thus, the present invention contributes much to the disposal of aqueous liquors containing chromate ion, furthermore, waste water from chromium plating processes.

The present invention will be further described in more detail by the following examples, to which the present invention is by no means limited.

EXAMPLE 1

Waste water from a chromium plating process which contained chromate ion (corresponding to about 5 g of chromium calculated as chromium) was adjusted to pH 3 with sulfuric acid and about 20 g of sodium nitrite then added at ambient temperature under stirring. After the reaction the pH of the reaction mixture was adjusted to 7–11, whereupon chromium (III) hydroxide precipitated. The residual liquid after separating the chromium (III) hydroxide precipitate was analized for the presence of chromate ion in usual manner to detect no chromate ion. On the other hand, to 67 g of chromium (III) hydroxide precipitate (water content: around 85%) containing 10 g of chromium (III) hydroxide was added 7 g of caustic soda in the form of ca. 12% aqueous solution to adjust the pH to 14, and 17 ml of 35% aqueous hydrogen peroxide was added very slowly under stirring, whereupon the chromium (III) hydroxide precipitated disappeared with heat generated and an aqueous solution formed. The thus obtained aqueous solution was then heated to a temperature near the boiling temperature thereof. The pH of the aqueous solution, after cooling, measured 12. Furthermore, this aqueous solution was analyzed for the presence of chromate ion in usual manner to detect chromate ion. Thereafter the aqueous solution containing the chromate ion was passed through an H form strongly acidic cation-exchange resin, DOWEX 50 W × 8, to obtain an aqueous chromic acid ($H_2CrO_4$) solution containing about 10 g of $CrO_3$ (calculated as $CrO_3$).

EXAMPLE 2

To waste water from a chromium plating process which contained chromate ion (corresponding to about 0.5 g Cr calculated as Cr) was added, at ambient temperature under stirring, about 2 g of sodium hydrogen sulfite, whereupon chromium (III) hydroxide ($Cr(OH)_3$) precipitated. The residual liquid after separating the chromium (III) hydroxide precipitate was analyzed for the presence of chromate ion to detect no chromate ion. On the other hand, to 4 g of the chromium (III) hydroxide precipitate (water content: around 80 to 90%) was added 100 ml of 7% aqueous hydrogen peroxide to which 0.3 g of caustic soda has been added, whereupon the chromium (III) hydroxide precipitate disappeared and an aqueous solution formed. This aqueous solution was analyzed for the presence of chromate ion to detect chromate ion. Thereafter, the thus obtained aqueous solution containing the chromate ion was passed through an H form strongly basic cation-exchange resin, DOWEX 50 W × 8 to obtain an aqueous chromic acid ($H_2CrO_4$) solution containing about 1 g of $CrO_3$ (calculated as $CrO_3$).

EXAMPLE 3

Waste water from a chromium plating process containing chromate ion (corresponding to 50 ppm of $CrO_3$ calculated as $CrO_3$) was passed, at the rate of 500 l/h, through a 20 l anthracite filter column or a commercially available 20 l cartridge filter, and then through a 25 l H form strongly acidic cation-exchange resin, LEWATIT SP 120, and a 25 l OH form medium basic anion-exchange resin, LEWATIT MP 64, in that order to obtain about 50 ton of cleaned up water of extremely high purity until the chromate ion began to leak out of the moderately basic anion-exchange resin.

On the other hand, through the above described moderately basic anion-exchange resin on which the chromate ion had been absorbed was passed slowly about 50 l of 5–10% aqueous sodium hydroxide solution to wash the resin and thereby to regenerate the same, while desorbing the chromate ion and transferring the same from the resin to the effluent therefrom. The thus obtained effluent was adjusted to the pH value of 3 with sulfuric acid and 19 kg of 35% aqueous sodium hydrogen sulfite then added. After the reaction, the pH of the reaction mixture was adjusted to a value of 7–11 to precipitate chromium (III) hydroxide. This chromium (III) hydroxide precipitate was washed with water and then dehydrated to produce chromium (III) hydroxide of 80–85% water content. To this chromium (III) hydroxide was added a 5–40% aqueous caustic soda solution obtained by dissolving 1.9 g of caustic soda in water, whereafter 35% aqueous hydrogen peroxide was added in portions under stirring. At the point of time when the chromium (III) hydroxide was completely dissolved to produce an aqueous solution containing the chromate ion, this chromate ion-containing aqueous solution was heated to a temperature near the boiling point thereof. After cooling, the chromate ion-containing aqueous solution was passed through a 50 l H form strongly acidic cation-exchange resin (DOWEX 50 W × 8) to obtain a 5–40% aqueous chromic acid solution containing 2.5 kg of chromic acid ($H_2CrO_4$).

With the cleaned-up water and aqueous chromic acid obtained in the manner as described above, satisfactory chromium plating was performed.

I claim:
1. A process for recovering chromic acid solution from an aqueous waste liquor containing chromate ions, comprising:
   a. adding to said waste liquor a reducing agent capable of reducing chromate ions to chromium (III) ions at an acidic pH;
   b. reducing said chromate ions in said waste liquor at an acidic pH until substantially all of said chromate ions are converted to chromium (III) ions;
   c. adding an alkaline reagent providing hydroxyl ions to the liquor containing said chromium (III) ions to make the pH of said liquor alkaline and to precipitate said chromium (III) ions as chromium (III) hydroxide;
   d. separating the precipitated chromium (III) hydroxide from the supernatant liquor which is substantially free of chromium ions;
   e. adding an alkali and aqueous hydrogen peroxide to the precipitated chromium (III) hydroxide in an amount sufficient to convert substantially all of said precipitate to a chromate ion-containing aqueous solution; and
   f. passing the resulting aqueous solution containing said chromate ions through an H form acidic cation-exchange resin to produce a chromic acid solution.

2. A process according to claim 1, wherein said waste liquor is an effluent from the regeneration step of a process of purifying waste water from a chromium plating process by passing it first through an H form acidic cation-exchange resin and then through an OH form basic anion-exchange resin and subsequently regenerating said basic anion-exchange resin with an alkaline aqueous solution.

3. A process according to claim 1, wherein said reducing agent being selected from the group consisting of ethanol, sodium nitrate, metallic iron, ferrous sulfate, sulfurous acid gas, sodium sulfite, ammonium hydrogen sulfite, potassium hydrogen sulfite, calcium hydrogen sulfite or sodium hydrogen sulfite.

4. A process according to claim 1, wherein said acidic cation-exchange resin is an H form strongly acidic cation-exchange resin.

5. A process according to claim 1, wherein said addition of the reducing agent is made after adjustment of the pH of said waste liquor to around pH 3.

6. A process according to claim 1, wherein said chromate ion-containing aqueous solution is produced by adding said alkali and aqueous hydrogen perioxide to said precipitated chromium (III) hydroxide to effect oxidation reaction at a pH of 7.5 or higher.

7. A process for recovering chromic acid solution from a chromate ion-containing waste liquor resulting from a chromium plating process, comprising:
   a. adding to said waste liquor a reducing agent capable of reducing chromate ions to chromium (III)

ions at an acidic pH, said reducing agent being selected from the group consisting of ethanol, sodium nitrite, metallic iron, ferrous sulfate, sulfurous acid gas, sodium sulfite, ammonium hydrogen sulfite, potassium hydrogen sulfite, calcium hydrogen sulfite or sodium hydrogen sulfite;

b. reducing said chromate ions in said waste liquor at an acidic pH of about 2.5 to 3.5 until substantially all of said chromate ions are converted to chromium (III) ions;

c. adding an alkaline reagent providing hydroxyl ions to the liquor containing said chromium (III) ions to make the pH of said liquor alkaline and to precipitate said chromium (III) ions as chromium (III) hydroxide;

d. separating the precipitated chromium (III) hydroxide from the supernatant liquor which is substantially free of chromium ions;

e. adding an alkali and aqueous hydrogen peroxide to the precipitated chromium (III) hydroxide in an amount sufficient to convert substantially all of saic precipitate to a chromate ion-containing aqueous solution; and f. passing the resulting aqueous solution containing said chromate ions through an H form strongly acidic cation-exchange resin to produce a chromic acid solution.

* * * * *